(12) United States Patent
Spitzer et al.

(10) Patent No.: US 9,250,931 B2
(45) Date of Patent: *Feb. 2, 2016

(54) SYSTEM, METHOD, AND COMPUTER PROGRAM PRODUCT FOR CALCULATING SETTINGS FOR A DEVICE, UTILIZING ONE OR MORE CONSTRAINTS

(75) Inventors: John F. Spitzer, Wimberley, TX (US); Oleg Vyacheslavovich Vinogradov, Moscow (RU); Sergey Sergeevich Grebenkin, Moscow (RU)

(73) Assignee: NVIDIA Corporation, Santa Clara, CA (US)

( * ) Notice: Subject to any disclaimer, the term of this patent is extended or adjusted under 35 U.S.C. 154(b) by 473 days.

This patent is subject to a terminal disclaimer.

(21) Appl. No.: 13/543,212

(22) Filed: Jul. 6, 2012

(65) Prior Publication Data
US 2014/0009470 A1    Jan. 9, 2014

(51) Int. Cl.
| | |
|---|---|
| G06F 15/00 | (2006.01) |
| G06F 9/445 | (2006.01) |
| G06F 17/22 | (2006.01) |
| G06T 1/20 | (2006.01) |
| G09G 5/36 | (2006.01) |

(52) U.S. Cl.
CPC ........ *G06F 9/44505* (2013.01); *G06F 17/2247* (2013.01); *G06T 1/20* (2013.01); *G09G 5/363* (2013.01)

(58) Field of Classification Search
CPC ............ G06F 9/44505; G06F 17/2241; G06F 17/2247; G09G 5/363; G06T 1/20
USPC ....................................................... 345/501
See application file for complete search history.

(56) References Cited

U.S. PATENT DOCUMENTS

| | | | |
|---|---|---|---|
| 3,688,278 A | 8/1972 | Sauvan et al. | |
| 5,086,386 A | 2/1992 | Islam | |
| 5,671,351 A | 9/1997 | Wild et al. | |
| 5,958,058 A | 9/1999 | Barrus | |
| 5,987,624 A | 11/1999 | Eglit | |
| 6,044,476 A | 3/2000 | Ote et al. | |
| 6,059,842 A * | 5/2000 | Dumarot et al. | 717/153 |
| 6,314,479 B1 | 11/2001 | Frederick et al. | |
| 6,646,653 B2 | 11/2003 | San et al. | |
| 6,654,952 B1 | 11/2003 | Nair et al. | |

(Continued)

FOREIGN PATENT DOCUMENTS

| | | | |
|---|---|---|---|
| CN | 1752952 A | 3/2006 | |
| CN | 101303672 A | 11/2008 | |

(Continued)

OTHER PUBLICATIONS

Advisory Action from U.S. Appl. No. 12/001,669, dated Oct. 14, 2011.

(Continued)

*Primary Examiner* — Michelle L Sams
(74) *Attorney, Agent, or Firm* — Zilka-Kotab, PC

(57) ABSTRACT

A system, method, and computer program product are provided for calculating settings for a device, utilizing one or more constraints. In use, a plurality of parameters associated with a device is identified. Additionally, one or more constraints are determined, utilizing the plurality of parameters. Further, one or more settings are calculated for the device, utilizing the one or more constraints and the plurality of parameters.

16 Claims, 4 Drawing Sheets

(56) References Cited

U.S. PATENT DOCUMENTS

| | | |
|---|---|---|
| 6,753,881 B1 | 6/2004 | Callway et al. |
| 6,768,519 B2 | 7/2004 | Fujita et al. |
| 6,847,358 B1 | 1/2005 | Ford et al. |
| 6,850,973 B1 | 2/2005 | Larson et al. |
| 6,901,580 B2 | 5/2005 | Iwanojko et al. |
| 7,034,828 B1 | 4/2006 | Drebin et al. |
| 7,080,247 B2 | 7/2006 | Rochford, II et al. |
| 7,243,371 B1 | 7/2007 | Kasper et al. |
| 7,293,201 B2 | 11/2007 | Ansari |
| 7,299,382 B2 | 11/2007 | Jorapur |
| 7,603,445 B1 | 10/2009 | Fehrle |
| 7,626,944 B1 | 12/2009 | Riddle |
| 7,659,897 B1 | 2/2010 | Azar |
| 7,778,936 B2 | 8/2010 | Adhikari |
| 8,171,342 B2 | 5/2012 | Wu |
| 8,276,133 B1 | 9/2012 | Lebaredian et al. |
| 8,280,864 B1 | 10/2012 | Herz et al. |
| 8,296,781 B1 | 10/2012 | Lebaredian et al. |
| 9,092,573 B2 | 7/2015 | Spitzer et al. |
| 2001/0008021 A1 | 7/2001 | Ote et al. |
| 2002/0073415 A1 | 6/2002 | Kim et al. |
| 2002/0083228 A1 | 6/2002 | Chiloyan et al. |
| 2002/0095501 A1 | 7/2002 | Chiloyan et al. |
| 2003/0023841 A1* | 1/2003 | Atherton et al. ............ 713/1 |
| 2003/0033519 A1 | 2/2003 | Buckman et al. |
| 2003/0055930 A1 | 3/2003 | Haneda |
| 2003/0140333 A1 | 7/2003 | Odaka et al. |
| 2003/0225917 A1 | 12/2003 | Partamian et al. |
| 2004/0187103 A1 | 9/2004 | Wickham et al. |
| 2004/0199615 A1 | 10/2004 | Philyaw |
| 2004/0212610 A1 | 10/2004 | Hamlin |
| 2004/0249618 A1 | 12/2004 | Fine et al. |
| 2005/0076002 A1 | 4/2005 | Williams et al. |
| 2005/0104888 A1 | 5/2005 | Ford et al. |
| 2005/0120208 A1 | 6/2005 | Dobson |
| 2005/0133067 A1 | 6/2005 | Bergman |
| 2005/0225639 A1 | 10/2005 | Somers |
| 2006/0112057 A1 | 5/2006 | Lai |
| 2006/0132473 A1 | 6/2006 | Fuller et al. |
| 2006/0188174 A1 | 8/2006 | Minadakis |
| 2007/0002347 A1 | 1/2007 | Lai et al. |
| 2007/0055153 A1 | 3/2007 | Simopoulos et al. |
| 2007/0066403 A1 | 3/2007 | Conkwright |
| 2007/0098288 A1 | 5/2007 | Raskar et al. |
| 2007/0172140 A1 | 7/2007 | Kokemohr |
| 2007/0268204 A1 | 11/2007 | Kawabe |
| 2007/0277134 A1 | 11/2007 | Zhang et al. |
| 2007/0300203 A1 | 12/2007 | Jeong et al. |
| 2008/0005611 A1 | 1/2008 | Solyanik |
| 2008/0040732 A1 | 2/2008 | Akiyama et al. |
| 2008/0072077 A1 | 3/2008 | Orr |
| 2008/0102957 A1 | 5/2008 | Burman et al. |
| 2008/0133067 A1 | 6/2008 | DeMay |
| 2008/0242423 A1 | 10/2008 | Kerr et al. |
| 2008/0270569 A1 | 10/2008 | McBride et al. |
| 2009/0011835 A1 | 1/2009 | Hansen et al. |
| 2009/0057395 A1 | 3/2009 | He et al. |
| 2009/0064053 A1 | 3/2009 | Crawford et al. |
| 2009/0069084 A1 | 3/2009 | Reece et al. |
| 2009/0094076 A1 | 4/2009 | Reddy |
| 2009/0115778 A1 | 5/2009 | Ford et al. |
| 2010/0162201 A1 | 6/2010 | Shnaiderman et al. |
| 2010/0269137 A1 | 10/2010 | Nakajima et al. |
| 2010/0318855 A1 | 12/2010 | Beg et al. |
| 2012/0155475 A1 | 6/2012 | Vasseur et al. |
| 2012/0272220 A1 | 10/2012 | Calcagno et al. |
| 2013/0338966 A1 | 12/2013 | Spitzer |
| 2014/0011581 A1 | 1/2014 | Spitzer et al. |
| 2014/0012532 A1 | 1/2014 | Spitzer et al. |
| 2014/0013094 A1 | 1/2014 | Spitzer et al. |
| 2014/0013159 A1 | 1/2014 | Spitzer et al. |
| 2014/0013303 A1 | 1/2014 | Spitzer |

FOREIGN PATENT DOCUMENTS

| | | |
|---|---|---|
| TW | 413798 B | 12/2000 |
| TW | 201205427 A | 2/2012 |

OTHER PUBLICATIONS

Final Office Action from U.S. Appl. No. 12/001,669, dated Jul. 21, 2011.
Notice of Allowance from U.S. Appl. No. 12/001,669, dated Aug. 31, 2012.
Non-Final Office Action from U.S. Appl. No. 12/001,669, dated Feb. 17, 2011.
Non-Final Office Action from U.S. Appl. No. 12/001,669, dated May 11, 2012.
Final Office Action from U.S. Appl. No. 12/001,504, dated Feb. 7, 2012.
Notice of Allowance from U.S. Appl. No. 12/001,504, dated Jun. 7, 2012.
Non-Final Office Action from U.S. Application No. 12/001,504, dated Aug. 5, 2011.
Advisory Action from U.S. Appl. No. 11/958,266, dated Feb. 22, 2012.
Final Office Action from U.S. Appl. No. 11/958,266, dated Oct. 19, 2010.
Final Office Action from U.S. Appl. No. 11/958,266, dated Dec. 12, 2011.
Notice of Allowance from U.S. Appl. No. 11/958,266, dated Jul. 2, 2012.
Non-Final Office Action from U.S. Appl. No. 11/958,266, dated Feb. 23, 2010.
Non-Final Office Action from U.S. Appl. No. 11/958,266, dated Jun. 21, 2011.
Non-Final Office Action from U.S. Appl. No. 12/352,268, dated Feb. 10, 2012.
Ribeiro-Filho, J. L. et al., "Game: A Framework for Programming Genetic Algorithms Applications," IEEE, 1994, pp. 840-845.
U.S. Appl. No. 13/525,119, filed Jun. 15, 2012.
U.S. Appl. No. 13/543,196, filed Jul. 6, 2012.
U.S. Appl. No. 13/543,184, filed Jul. 6, 2012.
U.S. Appl. No. 13/543,228, filed Jul. 6, 2012.
U.S. Appl. No. 13/543,242, filed Jul. 6, 2012.
U.S. Appl. No. 12/352,268, filed Jan. 12, 2009.
Unigraphics Basics, Nov. 14, 2004, retrieved from https://web.archive.org/web/20041114135544/http:// homepages.cae.wisc.edu/~me232/ug/ug_basic.html.
Schmid, P., "Game Over? Core 2 Duo Knocks Out Athlon 64," Jul. 14, 2006, retrieved from http://www.tomshardware.com/reviews/core2-duo-knocks-athlon-64,1282-11.html.
Final Office Action from U.S. Appl. No. 12/352,268, dated Jan. 16, 2014.
Final Office Action from U.S. Appl. No. 12/352,268, dated Dec. 21, 2012.
Non-Final Office Action from U.S. Appl. No. 12/352,268, dated Jun. 19, 2014.
Non-Final Office Action from U.S. Appl. No. 12/352,268, dated Jun. 24, 2013.
Non-Final Office Action from U.S. Appl. No. 13/543,228, dated Jun. 13, 2014.
Non-Final Office Action from U.S. Appl. No. 13/543,242, dated Oct. 6, 2014.
Nyanchama, M. et al., "The Role Graph Model and Conflict of Interest", Feb. 1999, pp. 3-33.
Final Office Action from U.S. Appl. No. 12/352,268, dated Jan. 28, 2015.
Notice of Allowance from U.S. Appl. No. 13/543,228, dated Nov. 21, 2014.
Non-Final Office Action from U.S. Appl. No. 13/543,184, dated Jul. 22, 2014.
Final Office Action from U.S. Appl. No. 13/543,184, dated Dec. 3, 2014.
Non-Final Office Action from U.S. Appl. No. 13/525,119, dated Feb. 5, 2015.

(56) References Cited

OTHER PUBLICATIONS

Hellerstein, J., "Optimizing Software Packages for Application Management," IEEE, 2008, pp. 1-8.
Advisory Action from U.S. Application No. 13/543,184, dated Feb. 12, 2015.
Notice of Allowance from U.S. Appl. No. 13/543,228, dated Mar. 17, 2015.
Non-Final Office Action from U.S. Appl. No. 13/543,196, dated Mar. 18, 2015.
Office Action from Taiwan Patent Application No. 102123858, dated Mar. 13, 2015.
Final Office Action from U.S. Appl. No. 13/543,242, dated May 15, 2015.
Non-Final Office Action from U.S. Appl. No. 13/525,119, dated Jul. 2, 2015.
Notice of Allowance from U.S. Appl. No. 13/543,184, dated Jul. 27, 2015.
Final Office Action from U.S. Appl. No. 13/543,196, dated Jul. 17, 2015.
Office Action from Chinese Patent Application No. 201310284846.8, dated Sep. 30, 2015.
Advisory Action from U.S. Appl. No. 13/543,196, dated Sep. 16, 2015.
Notice of Allowance from U.S. Appl. No. 13/543,242, dated Sep. 16, 2015.
Notice of Allowance from U.S. Appl. No. 13/525,119, dated Oct. 23, 2015.

* cited by examiner

SYSTEM, METHOD, AND COMPUTER PROGRAM PRODUCT FOR CALCULATING SETTINGS FOR A DEVICE, UTILIZING ONE OR MORE CONSTRAINTS

FIELD OF THE INVENTION

The present invention relates to parameter analysis, and more particularly to determining a set of presets based on parameter analysis.

BACKGROUND

Many products in existence today include one or more parameters that influence an overall experience associated with the product. For example, computer games and other software may have many parameters that determine a quality of rendering, audio, game play, etc. However, current techniques for arranging the parameters associated with these products have been associated with various limitations.

For example, currently, customers may be responsible for manually adjusting a plurality of parameters associated with a product in order to determine appropriate settings for that product. This may result in less than optimal settings for the product, time-consuming trial and error by the customer, etc. There is thus a need for addressing these and/or other issues associated with the prior art.

SUMMARY

A system, method, and computer program product are provided for calculating settings for a device, utilizing one or more constraints. In use, a plurality of parameters associated with a device is identified. Additionally, one or more constraints are determined, utilizing the plurality of parameters. Further, one or more settings are calculated for the device, utilizing the one or more constraints and the plurality of parameters.

DETAILED DESCRIPTION

Figure 1:
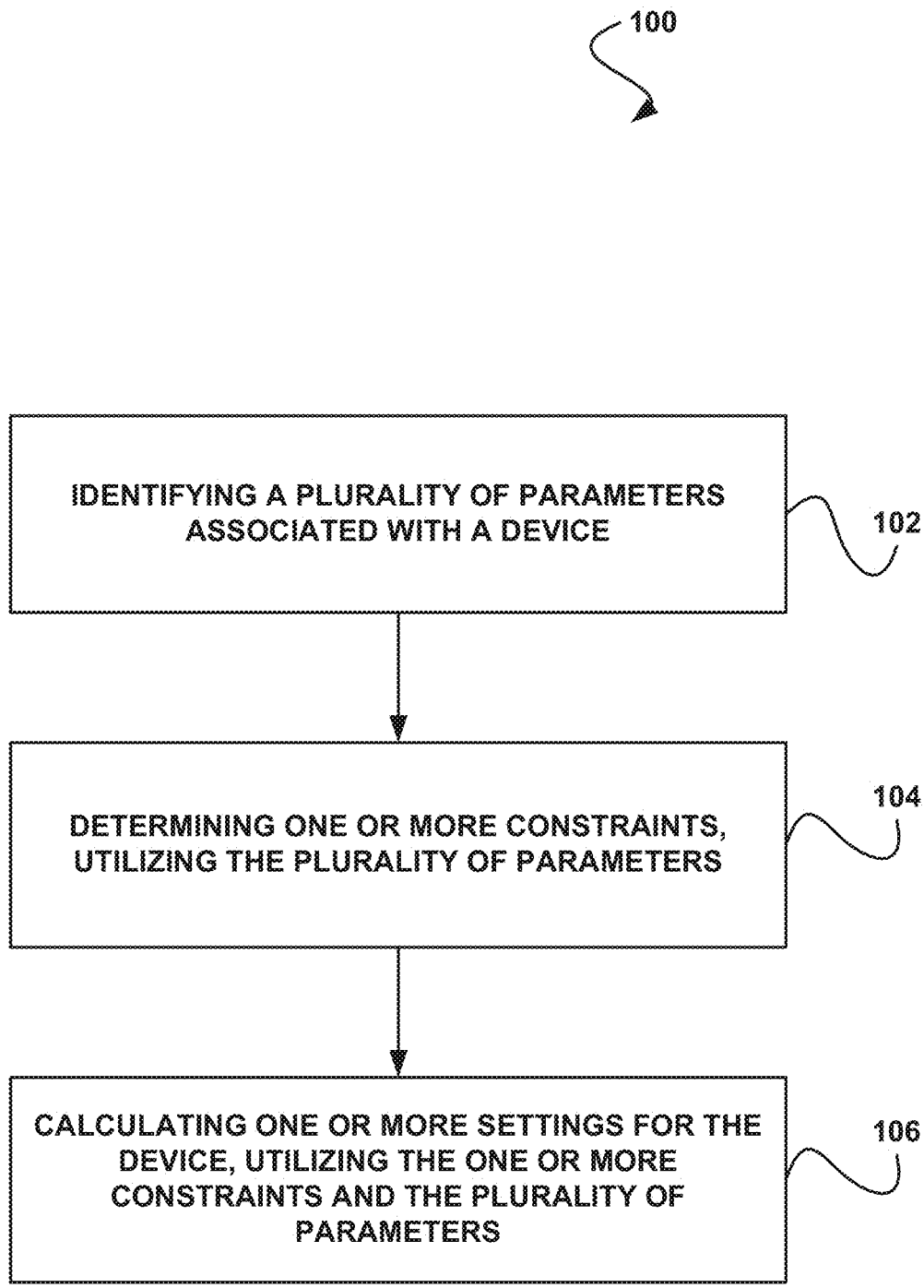
FIG. 1 shows a method for determining settings for a device, in accordance with one embodiment.

FIG. 1 shows a method 100 for determining settings for a device, in accordance with one embodiment. As shown in operation 102, a plurality of parameters associated with a device is identified. In one embodiment, the device may include any object that has a plurality of parameters associated with it. For example, the device may include an object such as a personal computer, personal digital assistant, cell phone, or other hardware element, an automobile, a house, etc.

Additionally, in one embodiment, the plurality of parameters may include any characteristics of the device. For example, the plurality of parameters may include descriptions of hardware (e.g., a central processing unit (CPU), a graphics processing unit (GPU), random access memory (RAM), a motherboard, a display, a resolution, etc.) installed within the device (e.g., a desktop computer, laptop computer, tablet computer, personal digital assistant, cellular telephone, etc.), software (e.g., an operating system, drivers, etc.) installed within the device, engine characteristics of an automobile (e.g., timing, header type, etc.), etc.

Further, in one embodiment, one or more of the plurality of parameters may be independently configurable. For example, each of the plurality of parameters may be able to be altered independently from the other parameters. In another embodiment, each of the plurality of parameters may be utilized by the device to perform one or more actions. In yet another embodiment, the plurality of parameters may be identified at a server. For example, the plurality of parameters may be sent from the product or service or an entity associated with the product or service to a server via a network (e.g., a wireless network, a wired network, a cellular network, a satellite network, etc.). In another example, details describing the plurality of parameters may be uploaded to the server from the device according to a predetermined interval (e.g., once a day, once a week, once a month, etc.).

Additionally, as shown in operation 104, one or more constraints are determined, utilizing the plurality of parameters. In one embodiment, the one or more constraints may be determined utilizing a directed acyclic graph (DAG). For example, the DAG may include a graph that is created that contains a plurality of directed nodes, where the nodes are directed based on one or more criteria. For instance, each of the plurality of nodes of the DAG may represent a combination of device parameters, and the nodes may be directed within the DAG based on the speed associated with each node, where the speed is determined based on the device parameters represented by the node. In another embodiment, the nodes may be directed in the DAG such that a first node of the DAG may point to a second node of the DAG when it is determined that the second node of the DAG is definitively faster in one or more respects (e.g., with respect to processing speed, etc.) than the first node of the DAG.

Further, in one embodiment, each node in the DAG may represent a unique variation of a plurality of varieties of possible parameters associated with the device or another device. For example, the plurality of possible parameters associated with the device may include a device CPU, a device GPU, and a device resolution, and each node in the DAG may represent a unique combination of a particular type of device CPU, device GPU, and device resolution. In this way, a first node pointing to a second node within the DAG signifies that the plurality of possible parameters associated with the device that are represented by the second node in the DAG offer definitively better processing speed and performance than the plurality of possible parameters associated with the device that are represented by the first node in the DAG.

Further still, in one embodiment, determining the one or more constraints may include identifying a node in the DAG that corresponds to the identified plurality of parameters associated with the device. For example, a node in the DAG that represents a variation of a plurality of possible parameters matching the identified plurality of parameters associated with the device may be identified and mapped to the device.

Also, in one embodiment, determining the one or more constraints may include determining a first subset of nodes in the DAG that are definitively slower than or equal in overall speed and performance to the identified node corresponding to the identified plurality of parameters associated with the device. For example, all nodes in the DAG that either directly or indirectly point to the identified node corresponding to the identified plurality of parameters associated with the device may be determined.

In addition, in one embodiment, determining the one or more constraints may include determining a second subset of nodes in the DAG that are definitively faster than or equal in overall speed and performance to the identified node corresponding to the identified plurality of parameters associated with the device. For example, all nodes in the DAG that are either directly or indirectly pointed to by the identified node corresponding to the identified plurality of parameters associated with the device may be determined.

Furthermore, in one embodiment, determining the one or more constraints may include calculating a maximum output that is possible to be produced by the first subset of nodes. For example, the maximum output for the first subset of nodes may include the highest image quality able to be processed and output by the nodes within the first subset. In another embodiment, the maximum output for the first subset of nodes may include the highest image quality able to be processed and output by the nodes within the first subset for a particular condition (e.g., a minimum allowable frame rate, etc.).

In another embodiment, one or more settings may be associated with the maximum output that is possible to be produced by the first subset of nodes. For example, a specific node within the first subset of nodes may be identified as corresponding to the plurality of parameters that are capable of producing the maximum output. In another embodiment, the specific node may be associated with one or more predetermined settings (e.g., the predetermined settings that enable the maximum output to be produced utilizing the given plurality of parameters, etc.), which may then be associated with the maximum output for the first subset of nodes.

For example, a monotonic set of presets may have been determined for one or more unique variations of the plurality of possible parameters associated with the device, where each unique variation is represented by a node in the DAG. See, for example, U.S. application Ser. No. 13/525,119, published as US2013/0338966, which is hereby incorporated by reference in its entirety, and which describes exemplary methods for determining a monotonic set of presets based on a plurality of parameters.

In another embodiment, the predetermined settings may be associated with one or more parameters that have been determined based on the plurality of possible parameters associated with the device (e.g., the plurality of parameters associated with a particular node, etc.). See, for example, U.S. application Ser. No. 12/001,669, now issued as U.S. Pat. No. 8,296,781, which is hereby incorporated by reference in its entirety, and which describes exemplary methods for determining application parameters based on hardware specifications.

Further still, in one embodiment, determining the one or more constraints may include calculating a minimum output that is not possible to be produced by the second subset of nodes. For example, the minimum output for the second subset of nodes may include the lowest image quality that is unable to be processed and output by the nodes within the second subset. In another embodiment, the minimum output for the second subset of nodes may include the lowest image quality that is unable to be processed and output by the nodes within the second subset for a particular condition (e.g., a minimum allowable frame rate, etc.).

In another embodiment, one or more settings may be associated with the minimum output that is not possible to be produced by the second subset of nodes. For example, a specific node within the second subset of nodes may be identified as corresponding to the plurality of parameters that are not capable of producing the minimum output. In another embodiment, the specific node may be associated with one or more predetermined settings (e.g., the predetermined settings that prevent the minimum output from being produced utilizing the given plurality of parameters, etc.), which may then be associated with the minimum output for the second subset of nodes.

Also, as shown in operation 106, one or more settings are calculated for the device, utilizing the one or more constraints and the plurality of parameters. In one embodiment, the one or more settings calculated for the device may include predefined settings for one or more of the plurality of parameters associated with the device. For example, the device may include a personal computer, and the settings may include predefined settings for one or more elements of hardware and software installed within the device.

Additionally, in one embodiment, the settings may be associated with one or more operations being performed by the product or service. For example, the settings may include predefined settings for running one or more software programs by the device. In another embodiment, the one or more settings calculated for the device may include settings for the identified plurality of parameters that result in a maximizing output (e.g., image quality, etc.) while maintaining a condition (e.g., a minimum frame rate, etc.).

Further, in one embodiment, the one or more constraints determined utilizing the plurality of parameters may provide boundaries to be used during the calculating of the one or more settings for the device. For example, the one or more constraints may include the maximum output that is possible to be produced by the first subset of nodes, which may be designated as a floor, starting point, minimum output amount, etc. when calculating the one or more settings for the device. In another example, the one or more constraints may include the minimum output that is not possible to be produced by the second subset of nodes, which may be designated as a ceiling, end point, maximum output amount, etc. when calculating the one or more settings for the device.

In another embodiment, the one or more constraints may include the one or more predetermined settings associated with the maximum output for the first subset of nodes, which may be designated as minimum possible settings when calculating the one or more settings for the device. Further, the one or more constraints may include the one or more predetermined settings associated with the minimum output for the second subset of nodes, which may be designated as maximum possible settings when calculating the one or more settings for the device.

Further still, in one embodiment, calculating the one or more settings for the device may include determining midpoint settings halfway between the minimum possible settings and the maximum possible settings, and determining whether the device is capable of maintaining the condition while performing with the midpoint settings. Additionally, if it is determined that the device cannot maintain the condition using the midpoint settings, then the device settings may be incrementally reduced until device settings are determined that enable the condition to be maintained. Further, if it is determined that the device can maintain the condition using the midpoint settings, then the device settings may be incrementally increased until device settings are determined that enable the condition to be maintained.

In this way, constraints may be applied to the plurality of parameters associated with a device when determining settings for the plurality of parameters of the device that result in a maximized output while maintaining a condition for the device. This may enable faster convergence upon optimized settings by leveraging predetermined settings from neighboring configurations within the DAG. Also, one or more predetermined settings may be determined for the device, while ensuring that predetermined criteria (e.g., a minimum frame rate condition, etc.) is net for the device. Additionally, by using a DAG, a binary search may be used to determine the one or more settings.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
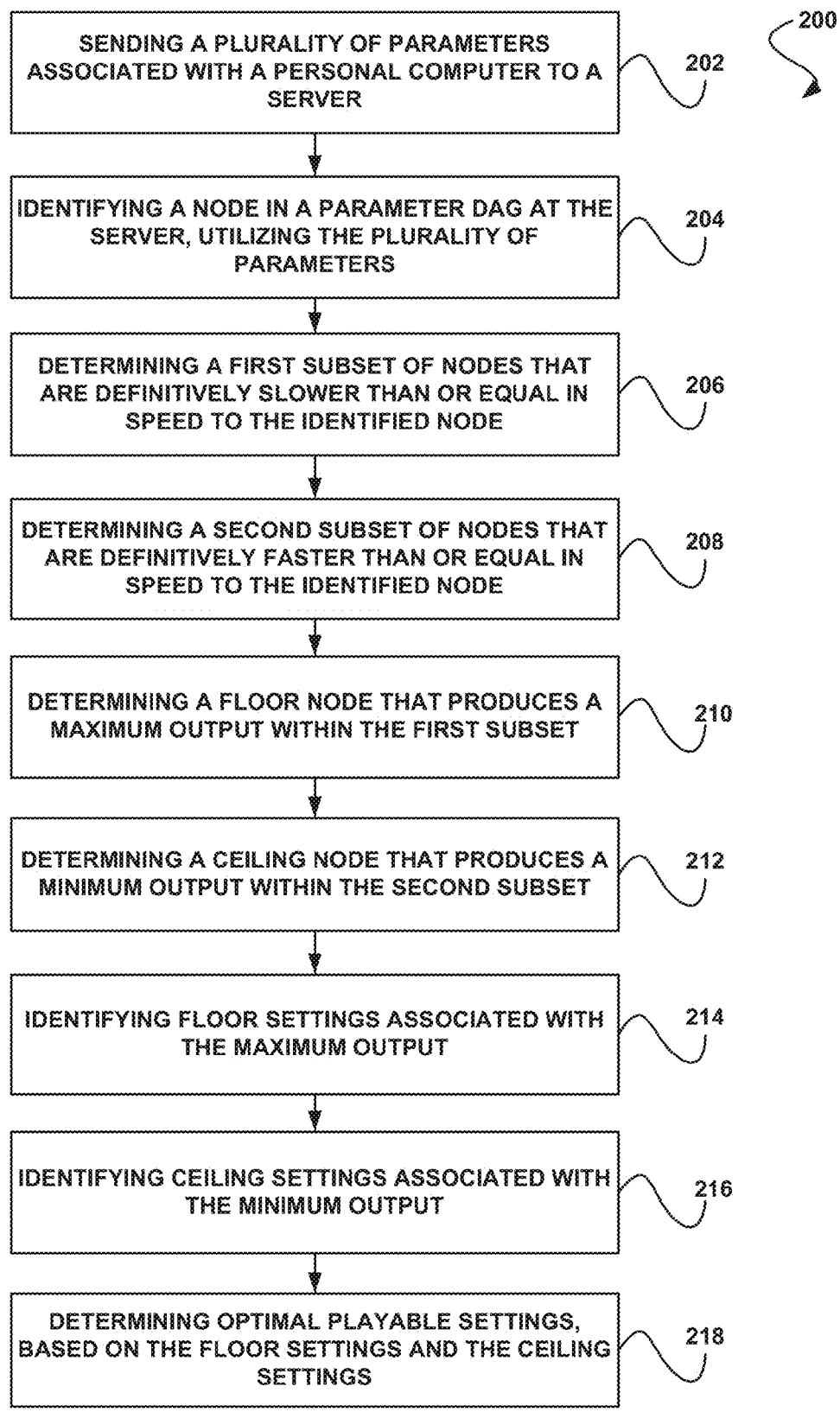
FIG. 2 shows a method for determining predetermined optimal playable settings for a personal computer, in accordance with another embodiment.

FIG. 2 shows a method 200 for determining predetermined optimal playable settings for a personal computer, in accordance with another embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, a plurality of parameters associated with a personal computer is sent to a server. In one embodiment, the plurality of parameters may include parameters associated with a display of the personal computer. For example, the plurality of parameters may include a screen resolution of the personal computer. In another embodiment, the plurality of parameters may include parameters associated with the rendering of graphics by the personal computer. For example, the plurality of parameters may include specifics of system hardware installed within the personal computer (e.g., CPU specifics, GPU specifics, motherboard specifics, RAM specifics, etc.), specifics of system software installed within the personal computer, etc.

Additionally, in one embodiment, the server may be remote from the personal computer, and the plurality of parameters may be sent to the server over a network. For example, software installed within the personal computer may obtain the plurality of parameters and may send such parameters to the server. In another embodiment, the server may be located within the personal computer, and the plurality of parameters may be sent to the server within the personal computer. Of course, however, the plurality of parameters may be sent to the server in any manner.

In another embodiment, the plurality of parameters associated with the personal computer may be sent to the server when a user runs an application on the personal computer. In yet another embodiment, the plurality of parameters associated with the personal computer may be sent to the server when a user installs an application on the personal computer. In still another embodiment, the plurality of parameters associated with the personal computer may be sent to the server when a user downloads an application on the personal computer. Of course, however, the plurality of parameters associated with the personal computer may be sent to the server as a result of any action or criteria.

Further, as shown in operation 204, a node in a parameter DAG is identified at the server, utilizing the plurality of parameters sent to the server. For example, the parameter DAG may include a plurality of nodes representing unique combinations of parameters for the personal computer, and a node within the DAG that represents all or a predetermined subset of the plurality of parameters sent to the server may be identified.

Further still, as shown in operation 206, a first subset of all nodes in the parameter DAG that are definitively slower than or equal in speed to the identified node is determined at the server. In one embodiment, each node in the parameter DAG may represent a unique combination of parameters for the personal computer, and each node in the parameter DAG may be associated with a predetermined speed (e.g., a speed at which the node's unique combination of parameters can process data). For example, a speed may be explicitly calculated or approximated for each unique combination of parameters for the personal computer, and such speed may be associated with its corresponding node.

Also, in one embodiment, the first subset of all nodes in the parameter DAG that are definitively slower than or equal in speed to the identified node may be determined by identifying all nodes that directly or indirectly point to the identified node. In addition, as shown in operation 208, a second subset of all nodes in the parameter DAG that are definitively faster than or equal in speed to the identified node is determined at the server. In one embodiment, the second subset of all nodes in the parameter DAG that are definitively faster than or equal in speed to the identified node may be determined by identifying all nodes that are directly or indirectly pointed to by the identified node.

Further, as shown in operation 210, a floor node that produces a maximum output within the first subset of nodes given a predetermined condition is determined. In one embodiment, the predetermined condition may include a predetermined minimum acceptable frame rate that is capable of being produced by the unique combination of parameters represented by each node in the DAG. In another embodiment, the floor node whose associated parameters produce the maximum output may include the node that provides the highest image quality, given the predetermined condition. In yet another embodiment, the floor node that produces the maximum output may be identified by comparing a magnitude of the output (e.g., an image quality, etc.) for the unique combination of parameters represented by each node in the first subset of nodes for a threshold frame rate.

Further still, as shown in operation 212, a ceiling node that produces a minimum output within the second subset of nodes given a predetermined condition is determined. In one embodiment, the ceiling node that produces the minimum output may include the node whose associated parameters produce the lowest image quality, given the predetermined condition. In yet another embodiment, the ceiling node that produces the minimum output may be identified by comparing a magnitude of the output (e.g., an image quality, etc.) for the unique combination of parameters represented by each node in the first subset of nodes for a threshold frame rate.

Also, as shown in operation 214, floor settings associated with a maximum output that is able to be produced by the floor node given the predetermined condition are identified. In one embodiment, the settings may include one or more settings assigned to the combination of parameters represented by the floor node that result in the maximum output while meeting the predetermined condition may also be identified. In addition, as shown in operation 216, ceiling settings associated with a minimum output that is produced by the ceiling node while violating the predetermined condition is identified.

In one embodiment, the settings assigned to the combination of parameters represented by the ceiling node may be incrementally increased until a predetermined frame rate condition is not met (e.g., the frame rate produced by the parameters is less than a threshold frame rate). Further, the settings may include one or more settings assigned to the combination of parameters represented by the ceiling node that produce the minimum output while violating the predetermined condition may also be identified.

Furthermore, as shown in operation 218, optimal playable settings are refined for the plurality of parameters associated with the personal computer, based on the floor settings and the ceiling settings. In one embodiment, midpoint settings for the plurality of parameters associated with the personal computer may be determined halfway between the floor settings and the ceiling settings. Additionally, in one embodiment, if a predetermined condition (e.g., a pass/fail Boolean condition, a threshold (e.g., frame rate, etc.), etc.) is met by the parameters given the midpoint settings, the settings may be incrementally increased until the predetermined condition is not met, and the last valid settings that meet the frame rate may be set as the optimal playable settings.

Conversely, in one embodiment, if a predetermined condition (e.g., frame rate, etc.) is not met by the parameters given the midpoint settings, the settings may be incrementally decreased until the predetermined condition is met, and the first valid settings that meet the frame rate may be set as the optimal playable settings. In this way, the floor settings and the ceiling settings may act as constraints in order to improve convergence when detecting the optimal playable settings for the personal computer.

Further still, in one embodiment, the first and second subsets of nodes, as well as the floor node and ceiling node, may constantly be refined during the determination of the optimal playable settings for the personal computer. In this way, new node subsets and floor and ceiling nodes may be determined any time during the determination of the optimal playable settings for the personal computer.

Figure 3:
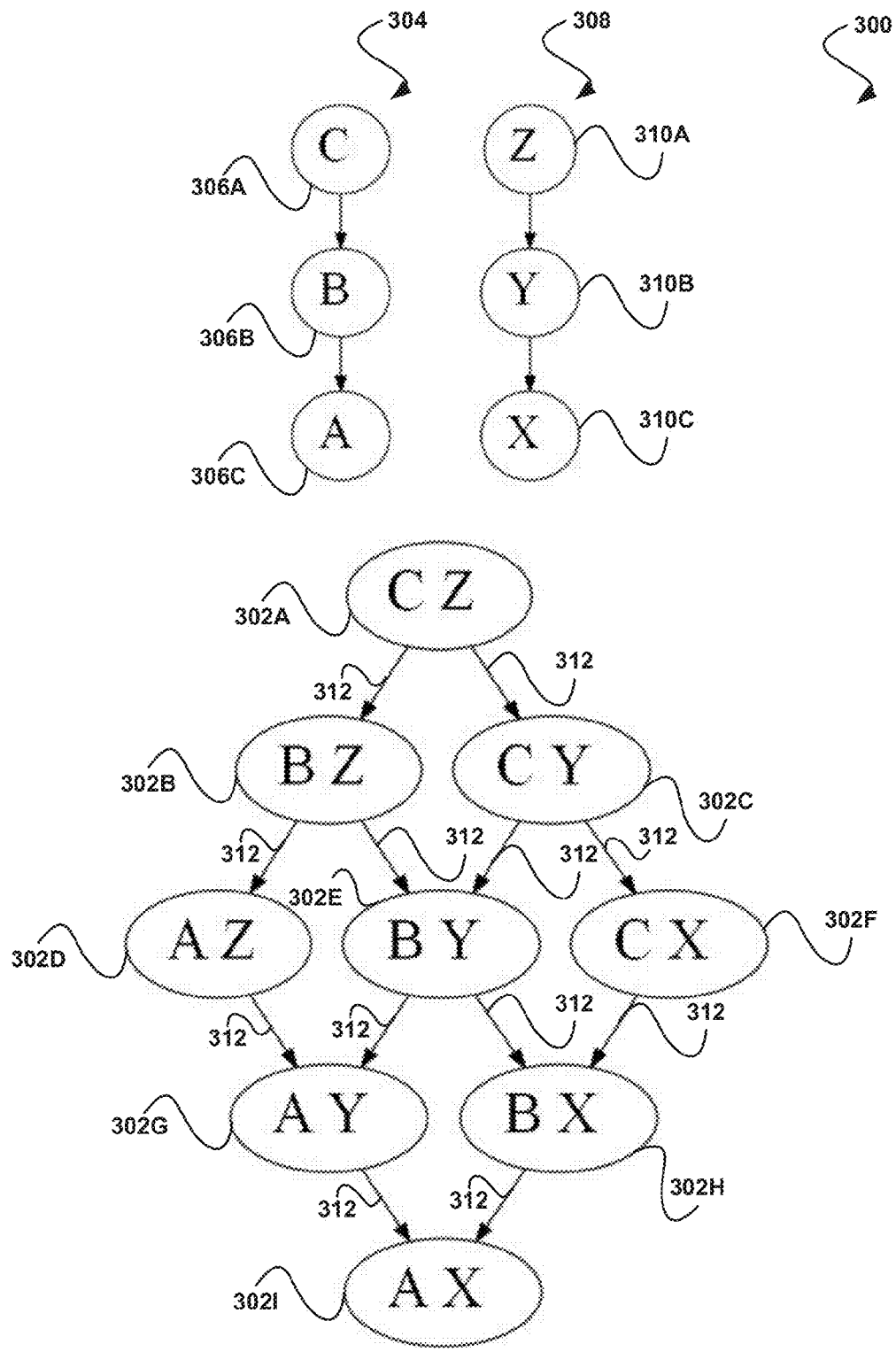
FIG. 3 shows an exemplary parameter DAG, in accordance with another embodiment.

FIG. 3 shows an exemplary parameter DAG 300, in accordance with another embodiment. As an option, the exemplary parameter DAG 300 may be carried out in the context of the functionality of FIGS. 1-2. Of course, however, the exemplary parameter DAG 300 may be implemented in any desired environment. It should also be noted that the aforementioned definitions may apply during the present description.

As shown, the exemplary parameter DAG 300 includes a plurality of nodes 302A-I that each correspond to a unique combination of a first set 304 of variations 306A-C of a first component (e.g., a CPU type, etc.) of a personal computer and a second set 308 of variations 310A-C of a second component (e.g., a GPU type) of the personal computer. In one embodiment, the DAG 300 may include a directed graph with no directed cycles formed by the collection of nodes 302A-I (e.g., vertices, etc.) and a plurality of directed edges 312, such that there is no way to start at any node in the DAG 300 and follow a sequence of edges that eventually loops back that starting node again.

Additionally, the nodes in both the first set 304 of variations 306A-C of the first component and the second set 308 of variations 310A-C of the second component are directed based on processing speed, with slower nodes pointing to faster nodes. As such, the first node 306A is the slowest node in the first set 304, the second node 306B is faster than the first node 306A but slower than the third node 306C in the first set 304, and the third node 306C is the fastest node in the first set 304.

In one embodiment, the speed of each of the nodes 302A-I may be determined utilizing one or more algorithms, benchmark tests, manufacturer disclosures, etc. In another embodiment, the location of the nodes 302A-I within the DAG 300 (including which nodes point to which nodes) may be determined by analyzing properties of components in each node and comparing the overall processing speed of each of the nodes 302A-I.

Additionally, as shown, directed edges 312 point from nodes corresponding to slower unique combinations of parameter variations of the personal computer to nodes corresponding to unambiguously faster unique combinations of parameter variations of the personal computer. In this way, the bottom node 302I corresponds to the fastest unique combination of parameter variations of the personal computer, whereas the top node 302A corresponds to the slowest unique combination of parameter variations of the personal computer.

Further, in one embodiment, an initial combination of parameter variations may be identified. For example, a calculated combination of parameter variations determined to be installed within a personal computer may be received from the personal computer. In one embodiment, the identified combination of parameter variations may be matched to node 302E within the DAG 300. For example, the identified combination of parameter variations may match the combination of parameter variations that node 302E corresponds to.

Further still, in one embodiment, it may be determined that a first node subset including nodes 302A, B, C, and D are definitively slower than or equal to node 302E. For example, nodes 302A, B, and C all directly or indirectly point to node 302E through directed vertices, and as a result, nodes 302A, B, and C are all definitively slower than node 302E. In another example, it may be determined that node 302D is slower than or equal in speed to node 302E.

Also, in one embodiment, it may be determined that a second node subset including nodes 302F, G, H, and I are definitively faster than or equal to node 302E. For example, nodes 302G, H, and I are all directly or indirectly pointed to by node 302E through directed vertices, and as a result, nodes 302G, H, and I are all definitively faster than node 302E. In another example, it may be determined that node 302F is faster than or equal in speed to node 302E.

Additionally, in one embodiment, it may be determined that the parameters represented by node 302D produce a maximum output within the first subset of nodes 302A, B, C, and D for a predetermined frame rate, given particular predetermined settings. In another embodiment, those particular predetermined settings of the node 302D may be set as floor settings. In yet another embodiment, it may be determined that the parameters represented by node 302F produces a minimum output within the second subset of nodes 302F, G, H, and I for a predetermined frame rate, given particular predetermined settings. In another embodiment, those particular predetermined settings of the node 302F may be set as ceiling settings.

Further, in one embodiment, optimal playable settings may be determined for the initial combination of parameter variations, where the floor settings and the ceiling settings dictate the range of settings to be tested during the determination. In this way, the accurate determination of settings for a node in the DAG 300 may converge in a rapid manner by leveraging results from neighboring nodes in the DAG 300.

Figure 4:
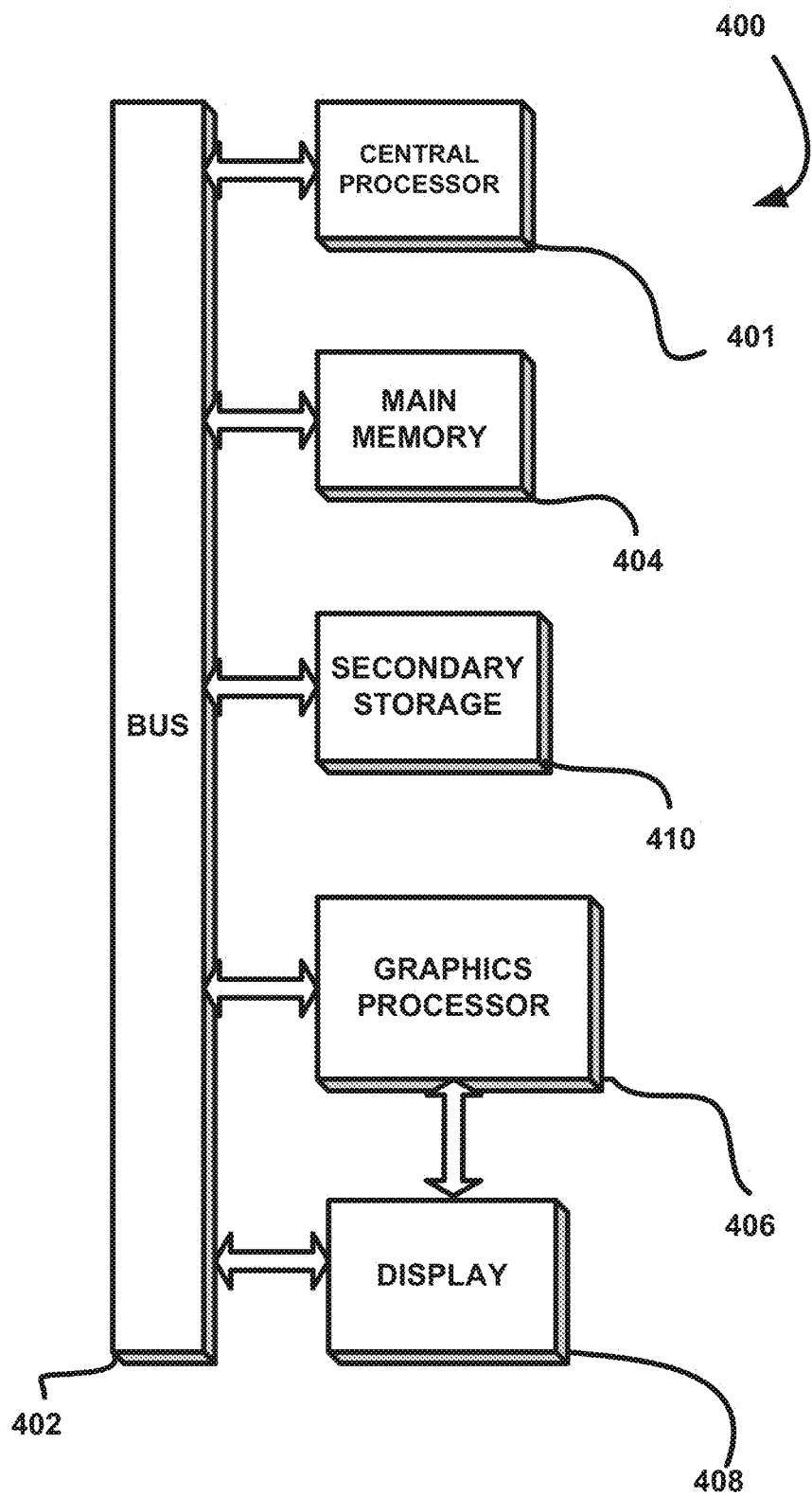
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, and/or any other type of logic. Still yet, the system 400 may take the form of various other devices in including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying a plurality of parameters associated with a device, including descriptions of hardware and software installed within the device;
   creating a directed acyclic graph (DAG) including a plurality of nodes, where each of the nodes represents a unique variation of the plurality of parameters associated with the device and where at least one node of the DAG is directly pointed to by two or more additional nodes of the DAG,
   determining, for each of the plurality of nodes, a speed associated with the node, where the speed is determined based on the parameters represented by the node, and directing the plurality of nodes within the DAG based on the speed associated with each node; and
   calculating one or more settings for the device, utilizing the plurality of nodes included within the DAG.

2. The method of claim 1, wherein determining the one or more constraints includes identifying a node in the DAG that corresponds to the identified plurality of parameters associated with the device.

3. The method of claim 2, wherein determining the one or more constraints includes determining a first subset of nodes in the DAG that are definitively slower than or equal in overall speed and performance to the identified node.

4. The method of claim 3, wherein determining the one or more constraints includes calculating a maximum output that is possible to be produced by the first subset of nodes.

5. The method of claim 4, wherein the maximum output for the first subset of nodes includes a highest image quality able to be processed and output by the nodes within the first subset for a particular condition.

6. The method of claim 4, wherein one or more settings are associated with the maximum output that is possible to be produced by the first subset of nodes.

7. The method of claim 4, wherein the one or more constraints include one or more predetermined settings associated with the maximum output for the first subset of nodes, which are designated as minimum possible settings when calculating the one or more settings for the device.

8. The method of claim 2, wherein determining the one or more constraints includes determining a second subset of nodes in the DAG that are definitively faster than or equal in overall speed and performance to the identified node.

9. The method of claim 8, wherein determining the one or more constraints includes calculating a minimum output that is not possible to be produced by the second subset of nodes.

10. The method of claim 9, wherein the minimum output for the second subset of nodes includes a lowest image quality that is unable to be processed and output by the nodes within the second subset for a particular condition.

11. The method of claim 9, wherein one or more settings are associated with the minimum output that is not possible to be produced by the second subset of nodes.

12. The method of claim 9, wherein the one or more constraints include one or more predetermined settings associated with the minimum output for the second subset of nodes, which are designated as maximum possible settings when calculating the one or more settings for the device.

13. The method of claim 1, wherein the one or more settings calculated for the device include predefined settings for one or more of the plurality of parameters associated with the device.

14. A computer program product embodied on a non-transitory computer readable medium, comprising code for:
   identifying a plurality of parameters associated with a device, including descriptions of hardware and software installed within the device;
   creating a directed acyclic graph (DAG) including a plurality of nodes, where each of the nodes represents a unique variation of the plurality of parameters associated with the device and where at least one node of the DAG is directly pointed to by two or more additional nodes of the DAG, determining, for each of the plurality of nodes, a speed associated with the node, where the speed is determined based on the parameters represented by the node, and directing the plurality of nodes within the DAG based on the speed associated with each node; and calculating one or more settings for the device, utilizing the plurality of nodes included within the DAG.

15. A system, comprising:

a processor for:

identifying a plurality of parameters associated with a device, including descriptions of hardware and software installed within the device;

creating a directed acyclic graph (DAG) including a plurality of nodes, where each of the nodes represents a unique variation of the plurality of parameters associated with the device and where at least one node of the DAG is directly pointed to by two or more additional nodes of the DAG, determining, for each of the plurality of nodes, a speed associated with the node, where the speed is determined based on the parameters represented by the node, and directing the plurality of nodes within the DAG based on the speed associated with each node; and calculating one or more settings for the device, utilizing the plurality of nodes included within the DAG.

16. The system of claim 15, wherein the processor is coupled to memory via a bus.

* * * * *